United States Patent [19]

Tsujimoto et al.

[11] Patent Number: 5,677,400

[45] Date of Patent: Oct. 14, 1997

[54] PROCESS FOR PRODUCING SYNDIOTACTIC-1,2-POLYBUTADIENE

[75] Inventors: Nobuhiro Tsujimoto; Yoshisuke Baba; Osamu Kimura; Shuichi Sakaue, all of Ichihara, Japan

[73] Assignee: UBE Industries, Ltd., Yamaguchi-ken, Japan

[21] Appl. No.: 640,629

[22] Filed: May 1, 1996

[30] Foreign Application Priority Data

May 2, 1995 [JP] Japan .................. 7-108434

[51] Int. Cl.⁶ ................ C08F 4/70; C08F 2/18
[52] U.S. Cl. ................ 526/94; 526/91; 526/92; 526/93; 526/139; 526/140; 526/141; 526/142; 526/340.1
[58] Field of Search ................ 526/91, 93, 94, 526/139, 140, 141, 142, 92, 340.1

[56] References Cited

U.S. PATENT DOCUMENTS

| | | | |
|---|---|---|---|
| 3,901,868 | 8/1975 | Ueno et al. | 526/142 X |
| 5,109,082 | 4/1992 | Matsuda et al. | 526/138 X |
| 5,278,263 | 1/1994 | Burroway | 526/140 X |
| 5,346,971 | 9/1994 | Hongyo et al. | 526/140 X |
| 5,468,822 | 11/1995 | Tsujimoto et al. | 526/138 X |

*Primary Examiner*—Fred Teskin
*Attorney, Agent, or Firm*—Wenderoth, Lind & Ponack

[57] ABSTRACT

In a process for producing syndiotactic-1,2-polybutadiene by suspension polymerization wherein a mixture composed of 1,3-butadiene, a cobalt compound, and an organometallic compound or metal hydride containing a metal of group I, II or III of the periodic table is contacted with an initiator selected from the group consisting of carbon disulfide, phenyl isothiocyanate and xanthogenic compounds in an aqueous medium, the improvement comprising, after the preparation of the mixture, adding thereto an anti gelling agent selected from the group consisting of alcohols, aldehydes, ketones, carboxylic acid esters, nitriles, sulfoxides, amides and phosphoric acid esters, whereby the formation of a rubber-like gelation product in the mixture is inhibited.

8 Claims, 1 Drawing Sheet

PROCESS FOR PRODUCING SYNDIOTACTIC-1,2-POLYBUTADIENE

FIELD OF THE INVENTION

This invention relates to an improved process for producing syndiotactic-1,2-polybutadiene by aqueous suspension polymerization. More particularly, it relates to an industrially advantageous aqueous suspension polymerization process for producing syndiotactic-1,2-polybutadiene wherein the formation of a rubber-like gelation product is minimized.

DESCRIPTION OF THE RELATED ART

Syndiotactic-1,2-polybutadiene (hereinafter abbreviated as "SPB") exhibits a relatively high melting point, high crystallinity and excellent solvent resistance, and hence has wide industrial applications, for example, in the fields of films, fibers, coatings, adhesives and the like. Moreover, since SPB has reactive vinyl groups in the side chains, it can also be widely used as a modifier for various elastomers and as a material for the preparation of polymer alloys.

In early days, SPB having such wide industrial applications has been produced by solution polymerization (see U.S. Pat. Nos. 3,778,424 and 3,901,868). However, solution polymerization involves a problem in that, as the polymerization proceeds, the resulting SPB precipitates and adheres to the inner walls and agitating blades of the polymerizer, thus preventing the polymerization mixture from being agitated satisfactorily.

In order to solve this problem, aqueous suspension polymerization processes have been developed (see U.S. Pat. Nos. 4,429,085 and 4,506,031). Subsequently, several improved processes for producing SPB by aqueous suspension polymerization have been proposed. Basically, these processes are such that a mixture composed of 1,3-butadiene, a cobalt compound, and an organometallic compound or metal hydride containing a metal of group I, II or III : of the periodic table is contacted with an initiator selected from the group consisting of carbon disulfide, phenyl isothiocyanate and xanthogenic compounds in an aqueous medium (see, for example, U.S. Pat. Nos. 5,346,971 and 5,468,822).

In these processes, the catalyst components (i.e., the cobalt compound and the organometallic compound or metal hydride) are previously mixed with the butadiene monomer in order to avoid the decomposition of the catalyst components by direct contact with water. However, these processes still involve a problem in that, during the mixing of the butadiene monomer with the cobalt compound and the organometallic compound or metal hydride, part of the butadiene monomer is polymerized to form a rubber-like gelation product which adheres to the inner walls and agitating blades of the mixing vessel or adheres to and deposits on certain parts (e.g., strainer, pump valves and injection nozzle) of the line extending from the mixing vessel to the polymerizer, eventually causing the line to be blocked up.

SUMMARY OF THE INVENTION

It has now been found that the above-described formation of a rubber-like gelation product in a mixture composed of 1,3-butadiene, a cobalt compound, and an organometallic compound or metal hydride can be effectively inhibited by adding a certain compound such as an alcohol, aldehyde or ketone to the mixture after the preparation thereof.

Thus, the present invention provides, in a process for producing syndiotactic-1,2-polybutadiene by suspension polymerization wherein a mixture composed of 1,3-butadiene, a cobalt compound, and an organometallic compound or metal hydride containing a metal of group I, II or II of the periodic table is contacted with an initiator selected from the group consisting of carbon disulfide, phenyl isothiocyanate and xanthogenic compounds in an aqueous medium, the improvement comprising, after the preparation of the mixture, adding thereto an anti gelling agent selected from the group consisting of alcohols, aldehydes, ketones, carboxylic acid esters, nitriles, sulfoxides, amides and phosphoric acid esters.

The process of the present invention will be more specifically described hereinbelow.

DETAILED DESCRIPTION OF THE INVENTION

Figure 1:
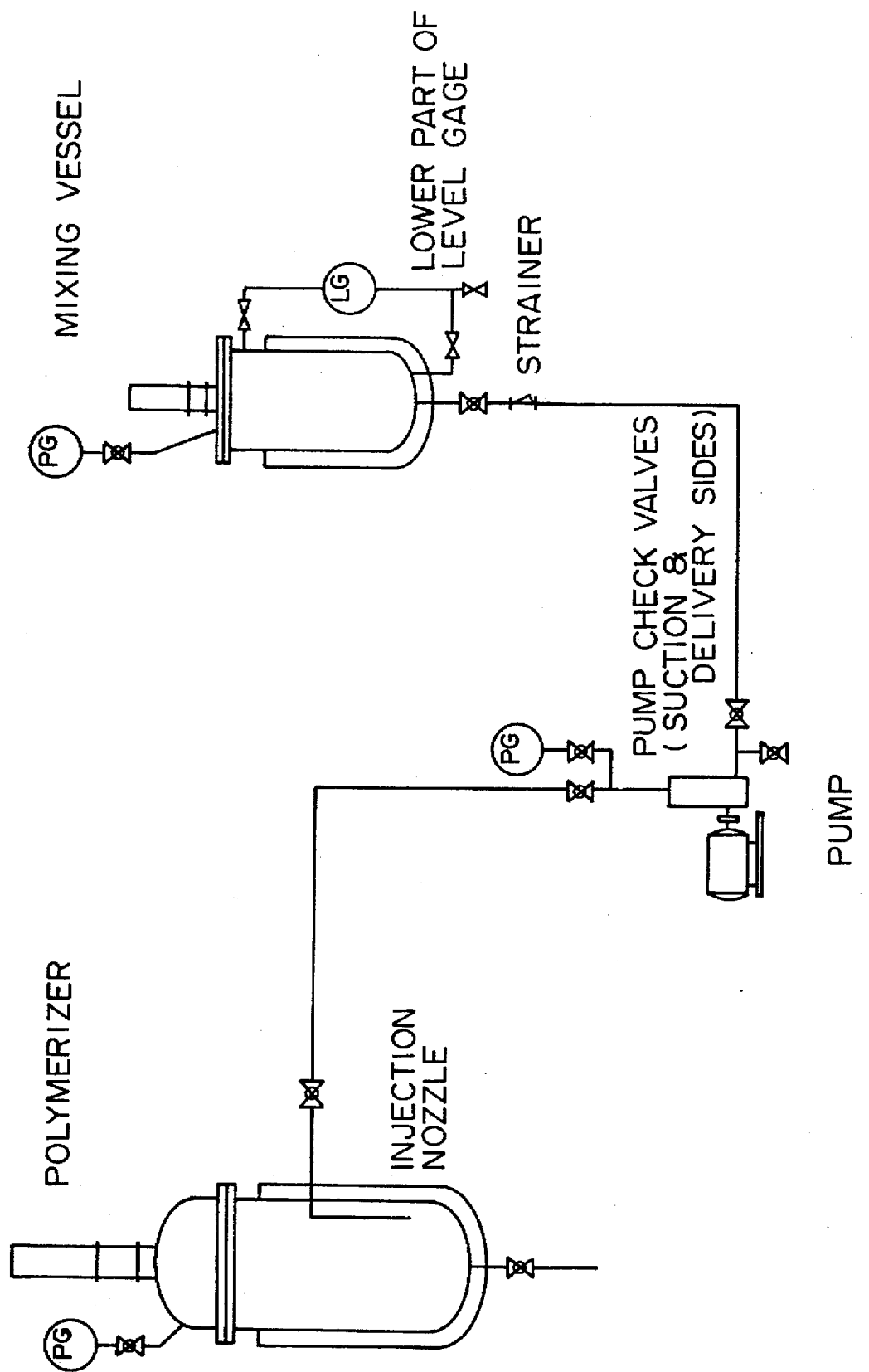
FIG. 1 illustrates a pilot plant which can be used in conducting the process of the present invention.

In the process of the present invention, butadiene monomer is first mixed with catalyst components comprising a cobalt compound and an organometallic compound or metal hydride containing a metal of group I, II or III of the periodic table.

As the butadiene monomer, 1,3-butadiene may be used alone. Alternatively, the butadiene monomer may consist essentially of 1,3-butadiene and additionally contain a minor amount of at least one other unsaturated monomer selected, for example, from conjugated dienes such as isoprene, chloroprene and myrcene; olefins such as ethylene, propylene, butene-1, butene-2, isobutene and pentene-1; aromatic vinyl compounds such as styrene and a-methylstyrene; and the like. However, it is generally desirable to restrict the content of the other unsaturated monomer to 30 mole %, preferably 10 mole %, based on the total amount of the monomers.

As the cobalt compound constituting a catalyst component, any salt or complex of cobalt that is commonly used in Ziegler catalysts can preferably be employed. Specific examples thereof include cobalt salts such as cobalt chloride, cobalt bromide, cobalt nitrate, cobalt octylate, cobalt naphthenate, cobalt acetate and cobalt malonate; organic base complexes of cobalt such as cobalt bisacetylacetonate, cobalt triacetyl acetonate, cobalt-ethyl acetoacetate, triarylphosphine complexes of cobalt halides, and trialkylphosphine complexes of cobalt halides; and pyridine complexes, picoline complexes and ethyl alcohol complexes of cobalt.

As the organometallic compound or metal hydride containing a metal of group I, II or III of the periodic table which is used as a catalyst component in combination with the above-described cobalt compound, any such compound that is commonly used in Ziegler catalysts can likewise be employed. Useful metals of groups I , II and III include lithium, sodium, potassium, magnesium, zinc, aluminum and the like. Among others, lithium, magnesium and aluminum are preferred.

As the above-described organometallic compound, an organolithium compound, an organomagnesium compound, an organoaluminum compound or the like can be used to advantage. Preferred examples of these compounds include trialkylaluminums, diakylaluminum chlorides, dialkylaluminum bromides, alkylaluminum sesquichlorides and alkylaluminum sesquibromides. Among others, triakylaluminums such as triethylaluminum, tributylaluminum and trioctylaluminum are especially preferred. As the above described metal hydride, a compound having the ability to reduce cobalt compounds can preferably be used. Specific examples thereof include lithium aluminum hydride, sodium boron hydride and lithium boron hydride.

The above-described butadiene monomer, cobalt compound, and organometallic compound or metal hydride may be mixed in the absence of solvent. In some cases, however, they may be mixed in the presence of a solvent which is inert to these ingredients. Useful solvents include, for example, hydrocarbon solvents such as toluene, benzene, xylene, n-hexane, mineral spirit, solvent naphtha and kerosene; and halogenated hydrocarbon solvents such as methylene chloride. The mixing may usually be carried out under stirred conditions at a temperature ranging from about −60° C. to about 50° C. and preferably about −30° C. to about 40° C.

The proportions of the cobalt compound and the organometallic compound or metal hydride to the butadiene monomer may vary according to the types of these compounds and other factors. However, the cobalt compound may generally be used in an amount, as expressed in terms of cobalt atoms, of 0.00001 to 0.01 mole, preferably 0.00002 to 0.005 mole, per mole of 1,3-butadiene present in the butadiene monomer, and the organometallic compound or metal hydride may generally be used in an amount of 0.1 to 500 moles, preferably 0.5 to 100 moles, per mole of the cobalt compound.

According to the present invention, an antigelling agent comprising a compound selected from the group consisting of alcohols, aldehydes, ketones, carboxylic acid esters, nitriles, sulfoxides, amides and phosphoric acid esters is added to the monomer/catalyst mixture prepared in the above-described manner.

Since this antigelling agent is added to the monomer/catalyst mixture in order to inhibit the formation of a rubber-like gelation product due to undesirable polymerization reactions which may occur before the mixture is subjected to aqueous suspension polymerization, the antigelling agent should be added as soon after the preparation of the mixture as possible. For example, it is desirable to add the antigelling agent to the mixture and mix it intimately therewith, during a period of time which ranges from 0.5 to 30 minutes after the addition of the cobalt compound and the organometallic compound or metal hydride to the butadiene monomer is completed and when a homogeneous mixture is presumed to have been formed.

No strict limitation is placed on the amount of antigelling agent added, so long as it is not less than 1 mole per mole of cobalt atoms present in the cobalt compound. Although the amount of antigelling agent added may vary widely according to the type of the antigelling agent used and other factors, use of the antigelling agent in larger amounts than required is uneconomical. Moreover, if the antigelling agent is added in excessively large amounts, the melting point of the finally obtained SPB may be lowered significantly. Accordingly, it is generally preferable to add the antigelling agent in an amount of 1 to 100,000 moles, more preferably 2 to 50,000 moles, per mole of cobalt atoms present in the cobalt compound.

The alcohols which can be used as antigelling agents in the present invention include, for example, aliphatic alcohols such as methyl alcohol, ethyl alcohol, n-propyl alcohol, isopropyl alcohol, n-butyl alcohol, sec-butyl alcohol, tert-butyl alcohol, pentyl alcohol, hexyl alcohol and octyl alcohol; cycloaliphatic alcohols such as cyclobutyl alcohol, cyclopentyl alcohol, cyclohexyl alcohol and cyclododecyl alcohol; aromatic alcohols such as benzyl alcohol, diphenylcarbinol, cinnamyl alcohol, o-anise alcohol, m-anise alcohol and p-anise alcohol; and polyhydric alcohols, for example, diols such as ethylene glycol and propylene glycol, and triols such as glycerol.

The aldehydes usable as antigelling agents include, for example, aliphatic aldehydes such as formaldehyde, acetaldehyde, propionaldehyde, butyraldehyde, isobutyraldehyde, valeraldehyde, isovaleraldehyde, pivalic aldehyde, caproic aldehyde, heptyl aldehyde, caprylaldehyde, pelargonyl aldehyde, capric aldehyde, undecyl aldehyde, lauric aldehyde, tridecyl aldehyde, myristic aldehyde, pentadecyl aldehyde, palmitic aldehyde hyde and stearyl aldehyde; aliphatic dialdehydes such as glyoxal and succinic aldehyde; and aromatic aldehydes such as benzaldehyde, o-toluic aldehyde, m-toluic aldehyde, p-toluic aldehyde, salicylic aldehyde, α-naphthoic aldehyde, μ-naphthoic aldehyde, o-anisaldehyde, m-anisaldehyde, p-anisaldehyde and cinnamic aldehyde.

The ketones usable as antigelling agents include, for example, aliphatic ketones such as acetone, acetylacetone, methyl ethyl ketone, methyl propyl ketone, methyl isopropyl ketone, butyl methyl ketone, isobutyl methyl ketone, pinacolone, diethyl ketone, butyrone diisopropyl ketone and diisobutyl ketone; cycloaliphatic ketones such as cyclobutanone, cyclopentanone, cyclohexanone and cyclododecanone; and aromatic ketones such as acetophenone, propiophenone, butyrophenone, valerophenone, benzophenone, dibenzylphenone and acetonaphthone. In addition, diketone compounds can also be used as antigelling agents.

The carboxylic acid esters usable as antigelling agents include, for example, saturated fatty acid esters such as acetic acid esters, propionic acid esters, butyric acid esters, valeric acid esters, capric acid esters, enanthic acid esters, caproic acid esters, pelargonic acid esters and undecylic acid esters; unsaturated fatty acid esters such as crotonic acid esters, isocrotonic acid esters, undecylenic acid esters and oleic acid esters; aromatic carboxylic acid esters such as benzoic acid esters and phenylacetic acid esters; and ketonic acid esters such as acetoacetic acid esters.

The residues which constitute the alcohol moieties of the foregoing esters include, for example, alkyl groups of 1 to 20 carbon atoms, such as methyl, ethyl, n-propyl, isopropyl, n-butyl, isobutyl, n-pentyl, isoamyl, octyl and 2-ethylhexyl.

The nitriles usable as anti gelling agents include, for example, acetonitrile, benzonitrile, acrylonitrile, propionitrile and the like.

The sulfoxides usable as anti gelling agents include compounds represented by the general formula: $R_1R_2S=0$ wherein each of $R_1$ and $R_2$ represents an organic group. The sulfoxides are preferably dimethyl sulfoxide, diethyl sulfoxide, di-n-propyl sulfoxide, di-n-butyl sulfoxide, diisoamyl sulfoxide, di-n-heptyl sulfoxide, divinyl sulfoxide, diallyl sulfoxide, diphenyl sulfoxide, dibenzyl sulfoxide and methylallyl sulfoxide.

The amides usable as antigelling agents include compounds represented by the general formula: $R_3R_4NCOR_5$ wherein $R_3$, $R_4$ and $R_5$ each represent a hydrogen atom or an organic group. The amides are preferably selected, for example, from N-methylformamide, N-ethylformamide, N-propylformamide, N,N-dimethylformamide, N,N-diethylformamide, N,N-dipropylformamide, N-methylacetamide, N-ethylacetamide, N, N-dimethylacetamide, N,N-diethylacetamide, N,N-dipropylacetamide, N-methylformanilide, N-ethylformanilide, N,N-diphenylformamide and N,N-diphenylformanilide. Moreover, cyclic amides such as propiolactam, butyrolactam, valerolactam, caprolactam, N-methylpyrrolidone, N-ethylpyrrolidone and N-phenylpyrrolidone can also be used as antigelling agents.

The phosphoric acid esters usable as antigelling agents include compounds represented by the general formula: $(R_6O)_3PO$, $(R_7O)_2PO$ or $(R_9O)(R_{10}O)(R_{11}O)PO$ wherein $R_6$, $R_7$, $R_8$, $R_9$, $R_{10}$ and $R_{11}$ each represent an organic group. Examples of the phosphoric acid esters are trimethyl phosphate, triethyl phosphate, tributyl phosphate and tri-p-methylphenyl phosphate.

The above-described antigelling agents may be used alone or in admixture of two or more. Among the above-described antigelling agents, alcohols, ketones, carboxylic acid esters and sulfoxides are preferred. Especially preferred examples thereof are butanol, hexanol, acetone, ethyl acetate and dimethyl sulfoxide.

The monomer/catalyst mixture having an antigelling agent added thereto according to the present invention is usually fed to a polymerizer charged with an aqueous medium, where it is contacted with a separately fed initiator to effect the polymerization of butadiene.

As the initiator, there may used carbon disulfide $(CS_2)$, phenyl isothiocyanate $(C_6H_5NCS)$ or a xanthogenic compound $(CH_3CH_2OCSSH$ or its salt or ester). Among others, carbon disulfide is preferred. The initiators may generally be used in an amount of 0.1 to 5,000 moles, preferably 0.5 to 1,000 moles, per mole of the cobalt atom present in the cobalt compound used as catalyst.

On the other hand, the aqueous medium may comprise any medium that is used in common suspension polymerization processes, and examples thereof include aqueous solutions and dispersions comprising water in which a dispersant (e.g., an inorganic salt such as calcium chloride, or polyvinyl alcohol) and/or a surfactant is dissolved or dispersed. The dispersant may generally be used in an amount of 0.01 to 1 part by weight per 100 parts by weight of water, and water is preferably used in an amount of 1 to 30 moles, more preferably 2 to 20 moles, per mole of 1,3-butadiene.

If desired, a high-specific-gravity inert organic solvent having a specific gravity of not less than 1.1 (at 20° C.) may be added to the aqueous medium. As high-specific-gravity inert organic solvents, there may preferably be used halogenated aliphatic hydrocarbons such as methylene chloride, carbon tetrachloride, chloroform, bromoform and trichlene; halogenated aromatic hydrocarbons such as chlorobenzene, bromobenzene, chlorotoluene, dichlorobenzene, dibromobenzene, hexachlorobenzene and hexafluorobenzene; halogenated phenols such as chlorophenol, bromophenol, pentachlorophenol and pentabromophenol; sulfoxides such as dimethyl sulfoxide; and sulfuric diesters such as dimethyl sulfate and diethyl sulfate. The use of such a high-specific-gravity inert organic solvent makes it possible to produce particulate SPB having a small particle diameter and a narrow particle diameter distribution. Among the above-enumerated high-specific-gravity inert organic solvents, halogenated aliphatic hydrocarbons (in particular, methylene chloride) are preferred.

When such a high-specific-gravity inert organic solvent is used, it may be used in an amount of 10 to 100 parts by volume, preferably 20 to 80 parts by volume and more preferably 40 to 60 parts by volume, per 100 parts by volume of 1,3-butadiene used for purposes of polymerization.

Moreover, a compound selected from the group consisting of alcohols, aldehydes, ketones, carboxylic acid esters, nitriles, sulfoxides, amides and phosphoric acid esters may be added to the polymerization system as a melting point-regulating agent for the resulting SPB. This compound can be the same as that previously described as the antigelling agent. However, the same compound as that used as the antigelling agent need not necessarily be used, but any other compound may be used.

Although the amount of melting point-regulating agent used may vary according to the melting point desired for the final SPB product, the melting point-regulating agent is generally used in such an amount that the sum of the amounts of the above-described antigelling agent and the melting point-regulating agent is in the range of 0.00001 to 100 moles, preferably 0.00002 to 50 moles, per mole of 1,3-butadiene.

The aqueous suspension polymerization of 1,3-butadiene is usually carried out at a temperature of about 0° to about 100° C., preferably about 10° to about 50° C., under atmospheric pressure or under an elevated pressure up to the order of 10 atmospheres (gage pressure). The polymerization time may generally range from about 10 minutes to about 12 hours and preferably from about 30 minutes to about 6 hours.

The SPB formed by this polymerization may be separated from the aqueous medium in the usual manner, dried as required, and then subjected to a subsequent treatment.

According to the above-described process of the present invention, the formation of a rubber-like gelation product is inhibited in the period of time extending from the preparation of the monomer/catalyst mixture to its use in polymerization. Thus, the process of the present invention is very useful in the industrial production of SPB.

EXAMPLES

This invention is illustrated by the following examples, which are intended merely to illustrate preferable embodiments and not to be regarded as limiting the scope of this invention or the manner in which it can be practiced.

In these examples, the melting point (Tm) of SPB was determined from a DSC chart and the temperature corresponding to an endothermic peak was regarded as the melting point. DSC was carried out by using a SSC 5200 differential scanning calorimeter (manufactured by Seiko Electronic Industrial Co., Ltd.) and measuring 10 mg of a sample in an atmosphere of nitrogen at a heating rate of 10° C. per minute.

EXAMPLE 1

(1) Preparation of a Monomer/Catalyst Mixture

A 400 ml autoclave was charged with 150 g (2.8 moles) of butadiene. One minute after the addition of 0.6 millimole of cobalt octoate and 1.8 millimoles of triethylaluminum, 0.130 mole of acetone was added thereto. This mixture was stirred at room temperature for 5 hours.

(2) Measurement of the Amount of Gelation Product Formed in the Monomer/Catalyst Mixture The monomer/catalyst mixture prepared in the above-described procedure (1) was added to a vessel containing 600 ml of methanol so as to precipitate the resulting gelation product. This gelation product was separated by filtration through filter paper and then dried. The amount of rubber-like gelation product formed was 0.068 g.

EXAMPLES 2 and 3

Monomer/catalyst mixtures were prepared in the same manner as described in Example 1 (1), except that, in place of 0.130 mole of acetone, dimethyl sulfoxide was used in each of the amounts shown in Table 1 below. Then, the amount of rubber-like gelation product formed was measured in the same manner as described in Example 1 (2).

The results thus obtained, together with the result of Example 1, are in Table 1.

TABLE 1

| Example | Antigelling agent | | Amount of rubber like gelatin product formed (g) |
|---|---|---|---|
| | Type | Amount added | |
| 1 | Acetone | 0.130 | 0.068 |
| 2 | Dimethyl sulfoxide | 0.017 | 0.030 |
| 3 | Dimethyl sulfoxide | 0.034 | 0.011 |

EXAMPLE 4

(1) Preparation of a Monomer/Catalyst Mixture

A 400 ml autoclave was charged with 150 g (2.8 moles) of butadiene. One minute after the addition of 0.6 millimole of cobalt octoate and 1.8 millimoles of triethylaluminum, 0.065 mole of acetone was added thereto as an antigelling agent. This mixture was stirred at room temperature for 5 hours.

(2) Polymerization

A 1.5-liter autoclave was charged with 600 ml of ion-exchanged water, 2 g of polyvinyl alcohol, 120 ml of methylene chloride, and 30 ml (0.412 mole) of acetone as a melting point-regulating agent. While the contents of the autoclave were being stirred, the temperature thereof was adjusted to 10° C. After the monomer/catalyst mixture prepared in the above procedure (1) was added to the autoclave and dispersed at 10° C. for 10 minutes, the polymerization was initiated by the addition of 0.8 millimole of carbon disulfide. The polymerization was carried out at 30° C. for 60 minutes.

After completion of the polymerization, unreacted monomer was released, an antioxidant was added, and the polyvinyl alcohol was removed by washing with water. The SPB so formed was separated by filtration through filter paper and then dried.

The yield of the SPB was 130 g (87%) and the melting point thereof was 148° C.

(3) Measurement of the Amount of Gelation Product Formed in the Monomer/Catalyst Mixture The monomer/catalyst mixture prepared in the above-described procedure (1) was added to a vessel containing 600 ml of methanol so as to precipitate the resulting gelation product. This gelation product was separated by filtration through filter paper and then dried. The amount of rubber-like gelation product formed was 0.121 g.

EXAMPLES 5–11

SPB was produced in the same manner as described in Example 4(1) and (2), except that the respective antigelling agents and melting point-regulating agents shown in Table 2 below were used in their specified amounts. Then, the yield and melting point of the SPB were used. Moreover, the amount of rubber-like gelation product formed in each monomer/catalyst mixture was measured in the same manner as described in Example 4(3). The results thus obtained, together with the results of Example 4, are shown in Table 2.

Comparative Example 1

The procedure of Example 4 was repeated, except that the use of acetone in Example 4(1) was omitted. The results thus obtained are shown in Table 2.

TABLE 2

| | Antigelling agent | | Melting point-regulating agent | | Amount of rubber-like gelation product formed in the monomer/catalyst mixture (g) | SPB formed | |
|---|---|---|---|---|---|---|---|
| | Type | Amount added (mol) | Type | Amount added (mol) | | Yield (g) | Melting point (°C.) |
| Example 4 | Acetone | 0.065 | Acetone | 0.412 | 0.121 | 130 | 148 |
| Example 5 | Acetone | 0.262 | Acetone | 0.215 | 0.039 | 132 | 147 |
| Example 6 | Dimethyl sulfoxide | 0.067 | Acetone | 0.477 | 0 | 125 | 147 |
| Example 7 | Dimethyl sulfoxide | 0.173 | Acetone | 0.477 | 0 | 120 | 145 |
| Example 8 | Hexanol | 0.05 | Hexanol | 0.20 | 0.030 | 123 | 144 |
| Example 9 | Hexanol | 0.10 | Hexanol | 0.15 | 0.012 | 125 | 145 |
| Example 10 | Ethyl acetate | 0.10 | — | — | 0.102 | 80 | 170 |
| Example 11 | Ethyl acetate | 0.30 | — | — | 0.040 | 120 | 148 |
| Comparative Example 1 | — | — | Acetone | 0.477 | 0.598 | 130 | 148 |

EXAMPLE 12

Using a pilot plant (including a 145-liter polymerizer and a 40-liter mixing vessel) illustrated in FIG. 1, polymerization was carried out in semibatch operation.

The polymerizer was charged with 60 liters of ion-exchanged water, 15 g of polyvinyl alcohol, and 160 millimoles of carbon disulfide. While the contents of the polymerizer were being stirred, the temperature thereof was adjusted to 20° C.

On the other hand, the mixing vessel was charged with 24 liters of butadiene, 60 millimoles of cobalt octoate, and 120 millimoles of triethylaluminum. The contents of the mixing vessel were stirred at 10° C. to prepare a mixture.

After 10 minutes, 100 ml of acetone was added to the mixing vessel, and the mixture was fed to the polymerizer for 80 minutes at a rate of 300 ml per minute. After completion of the feeding, polymerization was carried out for 30 minutes. Thus, 13.0 kg of SPB was obtained without causing any gelation product to adhere to the mixing vessel and the feed line.

Comparative Example 2

The procedure of Example 12 was repeated, except that no acetone was added to the mixing vessel. Fifteen minutes after starting the feeding of the mixture to the polymerizer, the level gage, strainer, pump valves, injection nozzle and the like were clogged with a gelation product, so that the polymerization had to be discontinued.

What is claimed is:

1. In a process for producing syndiotactic-1,2-polybutadiene by suspension polymerization wherein a mixture comprising of 1,3-butadiene, a cobalt compound, and an organometallic compound or metal hydride containing a metal of group I, II or III of the periodic table is contacted with an initiator selected from the group consisting of carbon disulfide, phenyl isothiocyanate and xanthogenic compounds in an aqueous medium, the improvement comprising, after the preparation of the mixture, adding thereto an antigelling agent selected from the group consisting of alcohols, aldehydes, ketones, carboxylic acid esters, nitriles, surfoxides, amides and phosphoric acid esters.

2. The process of claim 1 wherein the antigelling agent is an alcohol, a ketone, a carboxylic acid ester or a sulfoxide.

3. The process of claim 1 wherein the antigelling agent is n-butyl alcohol, hexyl alcohol, acetone, ethyl acetate or dimethyl sulfoxide.

4. The process of claim 1 wherein the antigelling agent is added in an amount of at least 1 mole per mole of cobalt atoms present in the cobalt compound.

5. The process of claim 1 wherein the antigelling agent is added in an amount of 1 to 100,000 moles per mole of cobalt atoms present in the cobalt compound.

6. The process of claim 1 wherein the antigelling agent is added as soon after the preparation of the mixture as possible.

7. The process of claim 1 wherein a high-specific-gravity inert organic solvent having a specific gravity of not less than 1.1 (at 20° C.) is added to the aqueous medium.

8. The process of claim 1 wherein a melting point-regulating agent selected from the group consisting of alcohols, aldehydes, ketones, carboxylic acid esters, nitriles, sulfoxides, amides and phosphoric acid esters is added to the polymerization system.

* * * * *